Dec. 1, 1964       S. D. BLITZER       3,159,037
COMBINATION PICK-OFF AND SELF-CHECK MECHANISM
FOR TRANSDUCERS
Filed June 27, 1961                    3 Sheets-Sheet 3

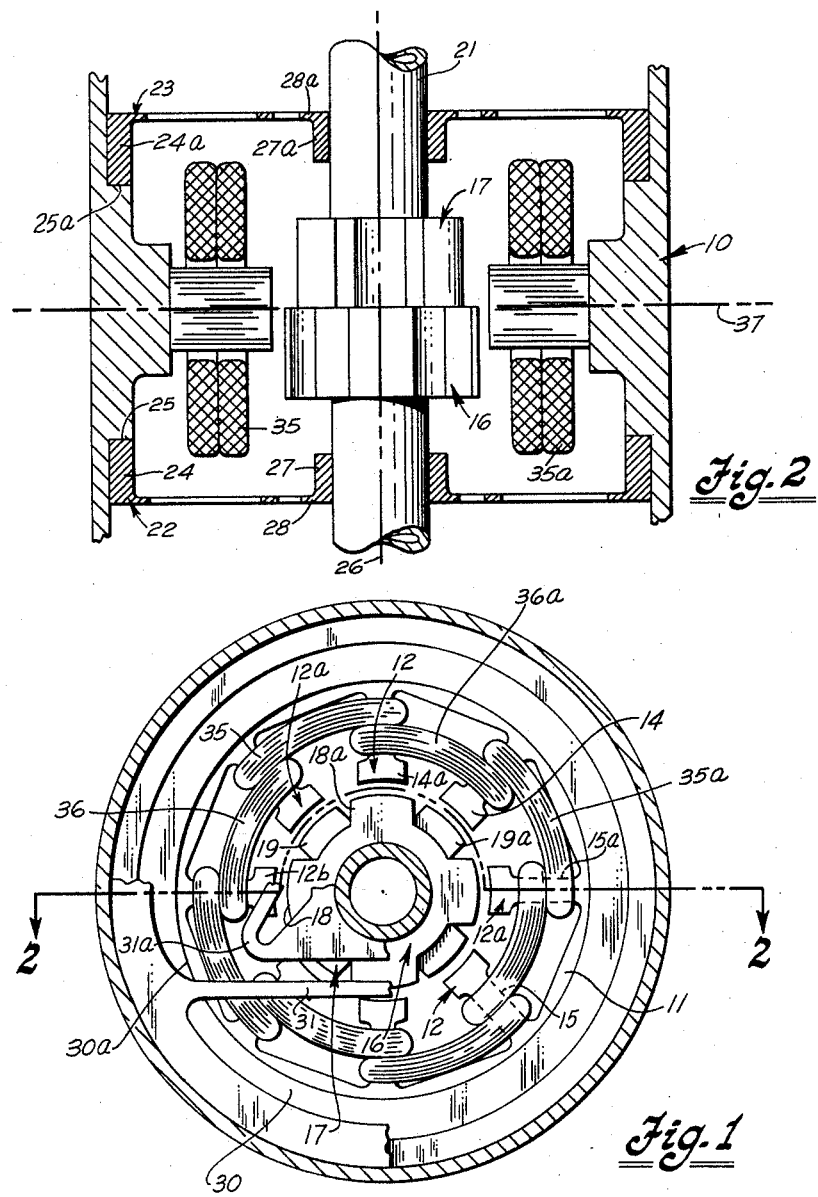

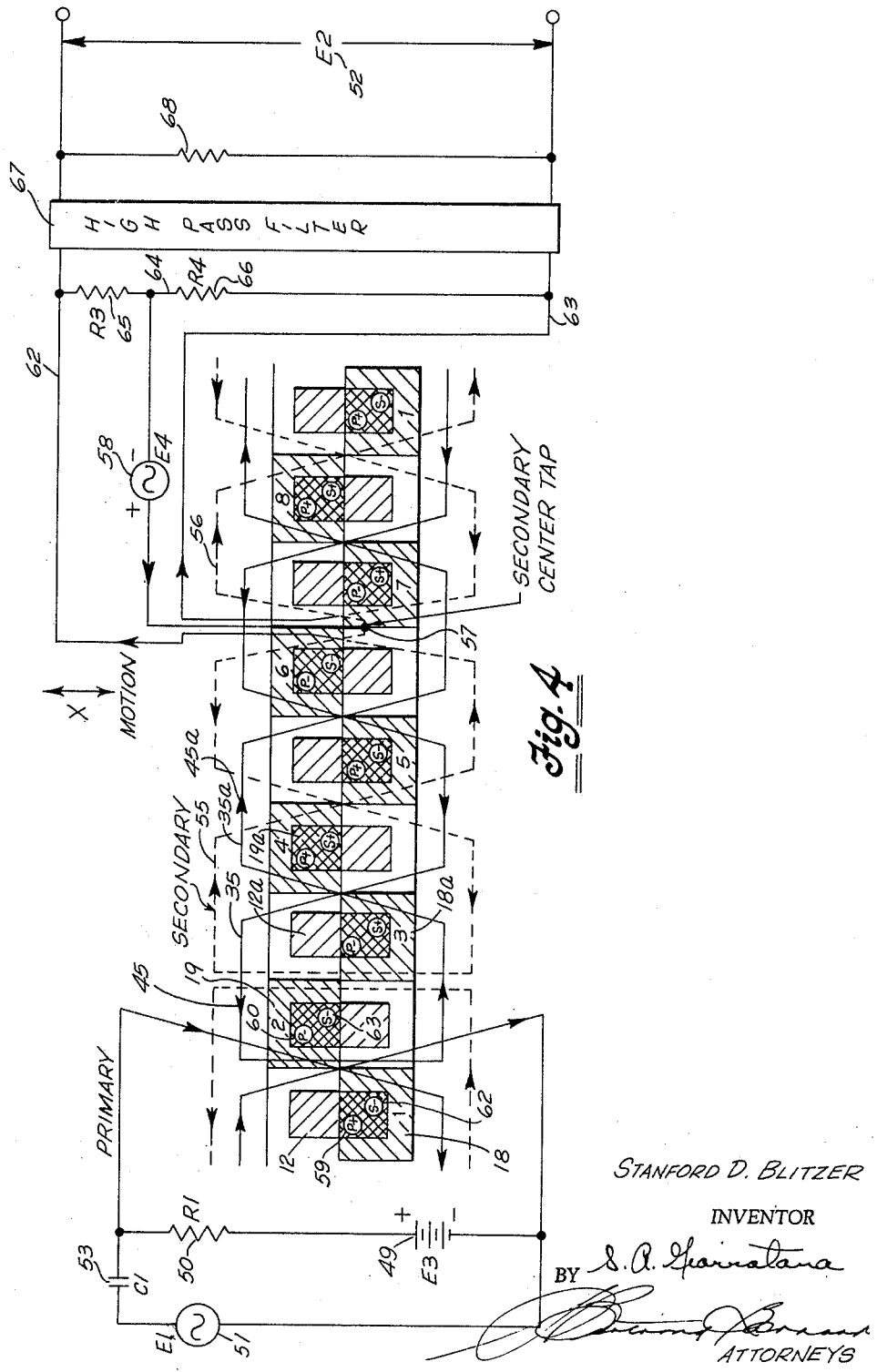

⊕ POSITIVE FLUX
● NEGATIVE FLUX
P1,P2 - PRIMARY EXCITATION
S1,S2 - SECONDARY OUTPUT

STANFORD D. BLITZER
INVENTOR.

BY
ATTORNEYS

United States Patent Office 3,159,037
Patented Dec. 1, 1964

3,159,037
COMBINATION PICK-OFF AND SELF-CHECK
MECHANISM FOR TRANSDUCERS
Stanford D. Blitzer, Newton Lower Falls, Mass., assignor to General Precision Inc., Little Falls, N.J., a corporation of Delaware
Filed June 27, 1961, Ser. No. 120,011
6 Claims. (Cl. 73—517)

This invention relates to transducers of various types, such as accelerometers, in which an electrically activated variable reluctance pick-off mechanism is provided to indicate the extent of the longitudinal or rotational displacement of one part of the apparatus, relative to the other. It is primarily directed to a means for combining with the variable reluctance pick-off mechanism, a self-check feature which enables an operator to either directly or remotely determine the functioning characteristics of the apparatus.

This application is related to an application for U.S. patent on a "Linear Accelerometer, Pick-off Mechanism and Damping Mechanism Combination" filed in the U.S. Patent Office on the 26th day of June 1961 by Stanford D. Blitzer, the inventor of the present application, and Dante V. Consalvo, Serial No. 130,707, and assigned to the same assignee as the present application.

The invention is suitable for use with variable reluctance transducers of various types, which are used to measure linear or angular displacement of a body, relative to a stator member.

These may take the form of a Linear Accelerometer, such as that shown in the drawings, or an angular accelerometer in which a proof-mass is rotatably angularly displaced, and equipped with a variable reluctance pick-off mechanism to determine the rotary angular displacement of the proof mass relative to the stator.

In devices of this character, it is frequently necessary to provide a self-check feature, which will enable an operator to readily determine either at the instrument proper, or at some remote point, whether the instrument is functioning properly.

This feature is of particular importance in guided missiles and the like, in which it is necessary to check out in detail all parts of the control mechanism, to determine their functional characteristics, before the missile is fired.

This feature is suitable for use with any pick-off mechanism in which the voltage couple from the primary coil to the secondary coil is a function of the permeance between the poles of the armature and those of the stator.

In a device of this character, the permeance, or reluctance is usually determined by the projected areas of the poles of the stator, relative to the poles of the armature, assuming relatively constant air gap.

These relative areas may be varied by longitudinal displacement in a linear instrument, such as a linear accelerometer, or rotary angular displacement in a rotatable instrument, such as an angular accelerometer.

Thus with an apparatus of this type, the variable reluctance pick-off can be simultaneously utilized for forcing and displacing the proof mass supported by the suspension means of the instrument and for monitoring the motion of the suspension means, and the proof mass supported thereby.

While shown in the drawings and described in conjunction with a linear displacement mechanism, essentially the same features apply to an apparatus in which rotary angular displacement is measured.

The accompanying drawings, illustrative of one embodiment of the invention and a modification thereof, together with the description of their construction and the method or operation, control, mounting, application and utilization thereof, will serve to clarify further objects and advantages of the invention.

In the drawings:

FIGURE 1 is a schematic front elevational view of the combination pick-off and self-check mechanism, shown in FIGURE 2.

FIGURE 2 is a schematic longitudinal section through the pick-off and self-check mechanism, shown in FIGURE 1, showing the armature and stator poles, the primary and secondary stator coils, and the flexure springs used for supporting the central tube, or proof mass, the section being taken on the line 2—2, FIGURE 1.

FIGURE 4 is a schematic developed view, similar to FIGURE 3, of the armature and stator poles of the accelerometer shown in FIGURE 2, and a schematic wiring diagram of the circuitry used in conjunction therewith, showing also the paths of the primary and secondary flux of the windings of the accelerometer shown in FIGURES 1 and 2.

Figure 5:
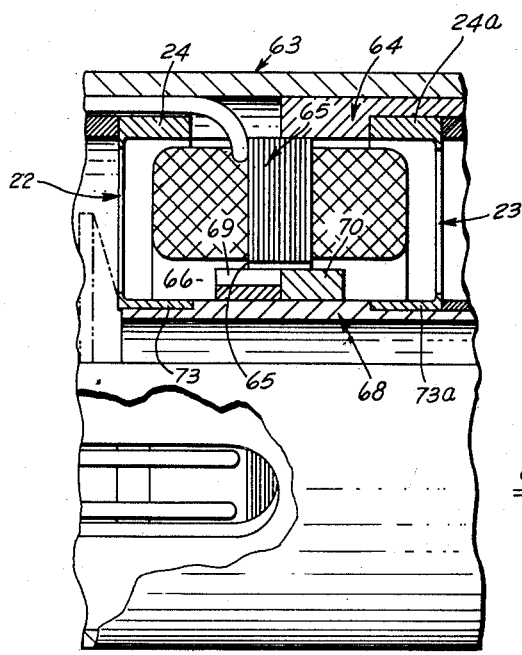
FIGURE 5 is a longitudinal section, similar to FIGURE 2, through a modification of the accelerometer, showing the central tube, the flexure springs supporting the central tube, the armature, the stator poles and the stator coils.

It will be understood that the following description of the construction and the method of attachment, wiring, operation and utilization of the combination pick-off and self-check mechanism for transducers, is intended as explanatory of the invention and not restrictive thereof.

In the drawings, the same reference numerals designate the same parts throughout the various views, except where otherwise indicated.

One embodiment of the construction shown in FIGURES 1 and 2 represents a linear transducer, fitted with a combination pick-off and self check mechanism.

This unit is mounted in the interior of a tubular housing 10, similar to that shown in FIGURE 5.

The stator is a substantially tubular member 11, fitted and fixedly attached to the interior of the tubular housing 10, the outer rim of the tubular stator having a total of eight radially positioned poles 12, 12a integral therewith and extending inward therefrom, as shown in FIGURE 1.

While eight poles are shown and described in conjunction with the construction shown in FIGURES 1 and 2, the actual number of poles would be any multiple of four.

Each of the poles proper 14, 14a, is of circular segmental form each pole being supported by a radially positioned spoke 15, 15a, each of which is integral with the outer rim 11, of the stator.

A tubular armature formed in two sections 16, 17, is mounted concentrically with the poles 12, 12a of the stator 11, the armature sections being supported by a central tube, or proof mass 21, which is located concentrically with the longitudinal or sensitive axis 26 of the unit.

Each section of the armature has a total of four radially positioned poles 18, 18a, 19, 19a integral therewith, the poles being radially aligned with the poles 12, 12a, of the stator 11, an annular air gap 20, being formed between the poles of the stator and the armature poles 18, 19, as shown in FIGURE 1.

The central tube 21, is supported by a pair of flexure plate springs 22, 23, each of which includes a tubular outer ring section 24, 24a, which is pressed into, or otherwise inserted into, and fixedly attached in shear to the inner diameter of one end of the housing 10, a shoulder 25, 25a formed at the inner end of each end section of the housing 10, as shown in FIGURE 5, laterally positioning each of the flexure springs 22, 23, and a tubular inner ring section 27, 27a, which is pressed on, or otherwise fixedly attached in shear to one reduced diameter end of the central tube 21.

While an inner housing is shown in the construction shown in FIGURES 1, 2 and 5, the inner housing may be eliminated entirely, the stator and the other parts of the apparatus being mounted in the tubular housing 10.

A thin central section or diaphragm 28, which is integral with each flexure spring 22, 23, forms the flexure portion of each spring 22, 23.

As shown in a portion of FIGURE 1, the central section, or diaphragm of each flexure spring has a plurality of arcuate cut-outs 30, 30a therethrough, to form a plurality of springs arms 31, 31a supporting an integral central hub 29 which in turn receives and supports the tubular inner ring section 27, of each flexure spring from the tubular outer ring section 24 thereof.

The arms of each diaphragm spring may be either relatively straight, with short bent ends 32, 32a as shown in FIGURE 1, or of arcuate contour, each arm extending from the tubular outer ring, to the tubular central hub section 29 thereof, which is integral with the tubular inner ring 27, thereby providing a positive connection and a high degree of longitudinal flexibility between the tubular outer ring 24, and the tubular inner ring 27 of each flexure spring.

As shown in FIGURE 1, the poles 1, 3, 5, 7 of one section 16 of the armature, are aligned with the corresponding poles 1, 3, 5, 7 of the stator 11.

Similarly, the poles 2, 4, 6, 8 of the second section 17 of the armature, are aligned with the other poles 2, 4, 6, 8 of the stator 11, in the normal position, shown in FIGURE 1.

As shown in FIGURES 1 and 2, a stator coil is wound around each pair of poles 12, 12a of the stator, a similar stator coil being wound around a pair of the alternate poles of the stator 11.

The windings of the stator consist of primary and secondary coils, the actual combination and arrangement of the coils being determined by the purpose for which a particular transducer is to be used.

In the construction shown in FIGURES 1 and 2, each of the series connected primary coils 35, 35a is mounted over two adjacent stator poles 12, 12a.

The secondary windings consist of a number of series connected secondary coils 36, 36a, each of the secondary coils being mounted over two adjacent poles 12a, 12b of the stator.

The direction of current flow in the stator alternates in each primary coil 35 and also in each secondary coil 36.

As there is one primary coil for each pair of stator poles 12, 12a and a secondary coil for each pair of stator poles 12a, 12b, there would be a total of four primary coils and four secondary coils in the construction shown in FIGURE 1.

The stator poles 12, 12a may be laminated, as shown in FIGURE 2, or solid.

The central tube 21 which supports the armature sections 16, 17, is supported by a pair of flexure disc springs 22, 23 as shown in FIGURES 1, 2 and 5, the flexure springs 22, 23 being adapted to restore the central tube 21 and the armature sections fitted thereto, to their initial position, when the central tube is displaced longitudinally along the sensitive axis 26, relative to the tubular housing 10, in which it is mounted.

In the neutral position, shown in FIGURE 2, the plane separating the two sections 16, 17 of the armature is aligned with the axis plane 37 of the stator poles.

When the armature sections 16, 17 are displaced longitudinally relative to the stator 11, the area of the face of one set of armature poles 18, 18a, relative to the corresponding poles 12, 12a of the stator, is varied as compared to the poles 19, 19a of the other armature section 17, the reluctance of the pole of one armature section and the subtended section of the stator pole 12, 12a, varies as compared to that of the poles of the second section 17 of the armature relative to the corresponding stator poles.

These variations in reluctance and consequently indications of the longitudinal displacement of the central tube, are transmitted to an external point as an indication of the extent of the longitudinal displacement of the central tube along the sensitive axis, and therefore the momentary acceleration of the instrument.

If there are $N_P$ pairs of stator poles 12, 12a, then the primary and secondary windings 35, 36, will each consist of $N_P$ coils connected in series.

The direction of current flow alternates in each primary coil and also in each secondary coil.

Figure 3:
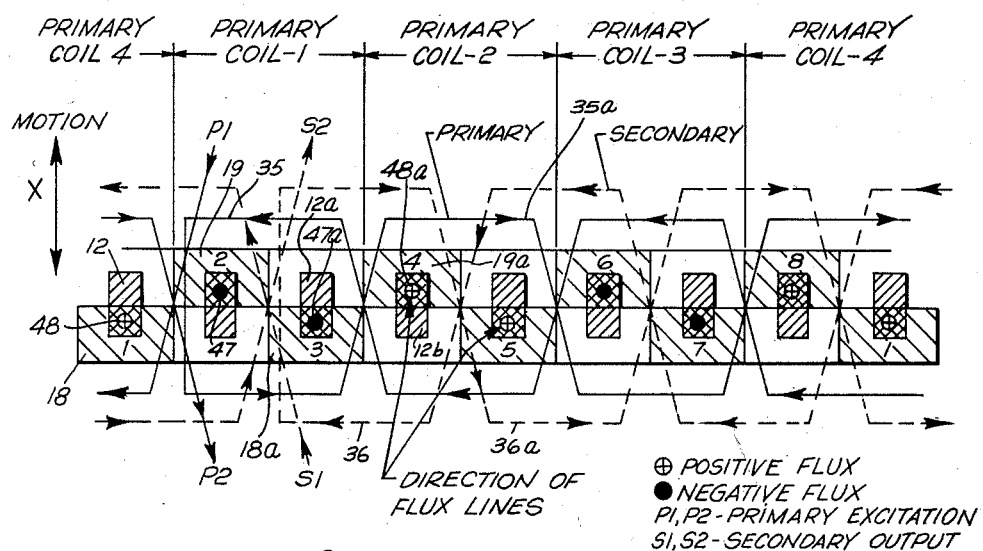
FIGURE 3 represents a schematic developed view of the armature and stator poles of the accelerometer shown in FIGURE 1, showing schematically the flux pattern in the normal operation of the pick-off mechanism of the transducer. The poles of the armature are shown centered relative to the poles of the stator, in a position, corresponding to that shown in FIGURE 1.

FIGURE 3 is a schematic developed view of the air gaps between the poles of the combination pick-off and self-check mechanism shown in FIGURES 1 and 2, to illustrate the flux pattern in normal operation of the combination pick-off and self-check mechanism functioning as a pick-off.

The odd-numbered poles 1, 3, 5, 7, represent the poles 18, 18a of the section 16 of the armature shown in FIGURES 1 and 2.

The even numbered poles 2, 4, 6, 8, which are equally spaced between the poles 18, 18a, represent the poles 19, 19a of the second section 17, of the armature.

The poles 12, 12a of the stator are respectively aligned with the poles 18, 18a and 19, 19a of both sections of the armature.

The primary windings 35, 35a are wound around pairs of poles 12, 12a of the stator in the manner shown in FIGURE 1.

The secondary windings 36, 36a are wound around alternate pairs of poles 12a, 12b, of the stator, in substantially the same manner, as those shown in FIGURE 1.

The direction of the flux lines through alternate primary windings 35, 35a run in opposite directions. The direction of the flux lines through alternate secondary windings 36, 36a likewise run in opposite directions.

The flux lines between the poles of the stator and the corresponding poles of the two armature sections are indicated by the symbols 47, 47a, 48, 48a shown in FIGURE 3.

The stator poles 1, 4, 5 and 8 and the corresponding poles of the armature sections have positive flux lines 47, 47a.

The stator poles 2, 3, 6 and 7 and the corresponding poles of the armature sections have negative flux lines 48, 48a therebetween.

FIGURE 4 is a schematic developed view of the air gaps between the poles of the combination pick-off and self-check mechanism, similar to FIGURE 3, and the circuitry used in conjunction therewith, to illustrate the flux pattern in the operation of the combination pick-off and self-check mechanism as a self-check mechanism.

The armature poles 18, 18a, 19, 19a are substantially the same as those shown in FIGURE 3.

The stator poles 12, 12a and their relation to the armature poles are substantially the same as those in FIGURE 3.

The constant current $I_1$ is supplied by a battery 49 ($E_3$) or other D.C. voltage source, the battery being in series with a resistor 50 ($R_1$).

The primary windings 35, 35a are excited by the A.C. voltage source $E_1$ (51). The signal output (52) $E_2$ appears at the outlet end of the circuit.

The capacitor (53) $C_1$, instead between the voltages (51) $E_1$ and (49) $E_3$, decouples the voltages $E_1$ and $E_3$.

The resistor (50) $R_1$ prevents voltage (49) $E_3$ from shorting out the voltage $E_1$ (51).

The secondary windings 55, 56 are split to provide a center tap at 57.

As shown in FIG. 3, the direction of the current in one primary coil is opposite that in the adjoining primary coil.

The resultant magnetomotive force producing the magnetic flux pattern is indicated in FIG. 3 by the arrow symbols 47, 47a, 48, 48a.

The flux pattern is located in a direction perpendicular to the plane of the coils.

The secondary coils are alternated relative to the primary coils, as shown in FIG. 1.

The secondary windings are wound around pairs of poles alternating with the pairs of poles on which the primary windings are wound.

The direction of winding each secondary winding is alternated relative to that of the adjoining secondary winding.

The entire group of secondary windings is alternated and interleaved relative to the primary windings.

When the proof mass is in its neutral position, the net flux through each secondary winding is zero.

The differential flux from the secondary windings, when the proof mass is moved from the neutral position, provides voltage through the secondary windings.

The sum of the voltage through all of the secondary windings is the total secondary and output voltage.

The forcing signal (58) $E_4$ is introduced in a symmetrical manner to the output voltage $E_2$ (52), in order that its direct effect at the output voltage $E_2$ (52) be zero.

The polarity of the flux produced by the primary ($I_1$) and the secondary ($I_2$) or $E_4$ (58) circuits, is indicated for each pole.

The positive flux of the primary windings is designated by P+ (59) and the negative flux by P− (60).

The positive flux of the secondary windings is designated by S+ (62) and the negative flux by S− (63).

In the even poles 2, 4, 6, 8 of the upper armature section 17, the secondary flux reinforces the primary flux. However, in the odd poles 1, 3, 5, 7 of the other armature section 16, the flux of the secondary windings 55, 56 opposes the flux of the primary windings 35, 35a.

The resultant axial force developed will be directed from the armature section 16, having the odd-numbered poles 1, 3, 5, 7 to the second section 17 of the armature having even-numbered poles 2, 4, 6, 8.

This resultant force produces longitudinal motion of the armature section 16, 17, and therefore the central tube 21 to which the armature sections are attached, along the sensitive axis 26.

The armature motion modulates the signal in the normal manner hereinbefore described for pick-off operation.

The output signal (52) $E_2$ is received from the center tap 57 through the secondary coils through a pair of lines 62, 63.

The forcing signal (58) $E_4$ is introduced into the lines 62, 63 leading to the output signal by means of a connecting line 64, a pair of resistors 65, 66 ($R_3$), ($R_4$) being introduced into the connecting line (64), one resistor being located between the forcing signal (58) $E_4$ and each line 62, 63 connected to the output signal.

A high pass filter 67 is introduced between the lines, 62, 63.

An additional load resistor 68 is introduced into a line connecting the two lines 62, 63 connected to the output signal 52 ($E_2$), beyond the high pass filter 67.

The operation of the unit shown in FIGURE 1, and schematically in FIGURES 3 and 4, is substantially as follows:

Operation

The nomenclature employed in formulae presented is as follows:

$P_\alpha$ = Permeance or gaps between numbered poles.
$P_\beta$ = Permeance of gaps between even numbered poles.
$P$ = Permeance of gap between corresponding stator and armature poles.
$\mu$ = Permeability of air.
$Y$ = Pole arc length.
$X_0$ = One-half stator stack height.
$X$ = Axial displacement of armature from center in normal position.
$g$ = Gap length.
$F_1$ = M.M.F. of each primary coil.
$F_{1m}$ = Peak value of $F_1$.
$F_2$ = M.M.F. of each secondary coil.
$I_1$ = Primary current.
$I_2$ = Secondary current.
$\phi_\alpha$ = Flux in gaps between odd-numbered poles.
$\phi_\beta$ = Flux in gaps between even-numbered poles.
$\phi_2$ = Flux linking each secondary coil.
$e_2$ = Induced voltage in secondary coils.
$N_p$ = Number of pairs of stator poles.
$W$ = Air gap energy.
$V$ = Air gap volume.
  = $gY (X_0 \pm X)$
$B$ = Air gap flux density.
$F$ = Force.
$A$ = Airgap area.
  = $Y(X_0 + X)$
$K$ = Spring constant of flexure springs suspending instrument.
$m$ = Proof mass or mass of suspension of instrument.
$\omega_n$ = Undamped natural frequency of spring.

FIGURE 3, is a developed view of the airgaps of the mechanisms shown in FIGURES 1 and 2, to illustrate the flux pattern in normal operation of the combination pick-off and self-check mechanism when used as a pick-off. The poles 18, 19 of the armature are shown in their centered position, relative to the poles 12, 12a of the stator.

The permeance of the gaps between the odd-numbered poles is given by—

$$P_\alpha = \frac{\mu Y}{g}(X_0 + X) \qquad (1)$$

The permeance of the gaps between the even numbered poles is given by—

$$P_\beta = \frac{\mu Y}{g}(X_0 - X) \qquad (2)$$

The M.M.F. of ecah primary and secondary coil is—

$$F_1 = 4\pi N_1 I_1 \qquad (3)$$

and $$F_2 = 4\pi N_2 I_2 = 0 \qquad (4)$$

The resultant flux in the odd and even numbered gaps respectively, are $$\phi_\alpha = F_1 P_\alpha \qquad (5)$$

and $$\phi_\beta = F_2 P_\beta \qquad (6)$$

The flux linking each pair of secondary coils is—

$$\phi_2 = \phi_\alpha - \phi_\beta = F_1(P_\alpha - P_\beta) \qquad (7)$$

The induced voltage in each secondary coil is—

$$e_2 = \frac{d}{dt}(N_2 \phi_2) = (P_\alpha - P_\beta)\frac{N_2 dF_1}{dt} \qquad (8)$$

Assuming a sinusoidal M.M.F.—

$$F_1 = F_{1m} \sin \omega t \qquad (9)$$

then $$\frac{dF_1}{dt} = \omega F_{1m} \cos \omega t \qquad (10)$$

From Equations 8 and 10, the induced voltage in each coil is $$e_2 = (P_\alpha - P_\beta)(N_2 \omega F_{1m} \cos \omega t) \qquad (11)$$

The total induced voltage in $N_p$ secondary coils is—

$$e_2 = (P_\alpha - P_\beta) N_P N F_{1m} \cos \omega t \qquad (12)$$

From Equations 1, 2 and 12—

$$e_2 = \frac{\mu Y}{g} N_p N_2 \omega F_{1m} \cos \omega t (X) \qquad (13)$$

Equation 12, indicates that the total secondary voltage is a linear function of the displacement.

From Equations 3 and 13—

$$\beta_2 = \frac{8\pi Y}{g} N_P N_1 N_2 \omega I_{1m} \cos \omega t (X) \qquad (14)$$

Forcer self-check operation—

Assume that the M.M.F. produced by each primary and secondary coil across the gaps between odd and even-numbered poles is—

$$F_1 = 4\pi N_1 I_1 \qquad (15)$$

and $$F_2 = 4\pi N_2 I_2 \qquad (16)$$

Assume that the polarity of these M.M.F.'s is such that the flux produced in the gaps between odd and even-numbered poles are—

$$\phi_\alpha = (F_1 + F_2) P_\alpha \qquad (17)$$

and $$\phi_\beta = (F_1 - F_2) P_\beta \qquad (18)$$

The energy in each gap is given by —

$$W = \frac{VB^2}{8\pi\mu} = \frac{gY}{8\pi\mu}(X_0 \pm X)B^2 \qquad (19)$$

The axial force is equal to the rate of change of energy with displacement X. Thus—

$$F = \frac{d\omega}{dx} = \pm \frac{YB^2}{8\pi\mu} \qquad (20)$$

But the flux density is—

$$B = \frac{\varphi}{A} = \frac{\varphi}{y(\omega_0 \pm x)} \qquad (21)$$

From Equations 1 and 21

$$B = \frac{\mu\varphi}{gP} \qquad (22)$$

and from Equations 20 and 22

$$F = \pm \frac{\mu y \varphi^2}{g\pi g P^2} \qquad (23)$$

From Equations 1, 2 and 23, the net force acting on one pair of odd-even poles is—

$$F = F_\alpha - F_\beta = \frac{\mu y}{8\pi g}\left[\frac{\varphi^2 \alpha}{P^2 \alpha} - \frac{\varphi^2 \beta}{P^2 \beta}\right] \qquad (24)$$

For $N_P$ pairs of poles, the force is—

$$F = \frac{\mu y N P}{8\pi g}\left[\frac{\varphi_2 \alpha}{P_2 \alpha} - \frac{\varphi^2 \beta}{P_2 \beta}\right] \qquad (25)$$

From Equations 1, 2, 17 and 18—

$$F = \frac{\mu y N P}{8\pi g}[(F_1 + F_2)^2 - (F_1 - F_2)^2]$$

$$= \frac{\mu y N P}{8\pi g}[4 F_1 F_2] = \frac{\mu y N P}{2\pi g} F_1 F_2 \qquad (26)$$

Finally, from Equations 15, 16 and 26

$$F = \frac{8\pi \mu y NP (N_1 N_2)(I_1 I_2)}{g} \qquad (27)$$

From Equation 27, it is seen that the force is independent of the axial displacement X.

If I is constant, then the force F acting on the armature is a linear function of $I_2$.

In a spring-restrained suspension, such as that shown in FIGURES 2 and 5, the resultant displacement is proportional to F and thus also proportional to $I_2$.

If an Equation 27—

$$I_1 = I_m \sin \omega_1 t \qquad (28)$$

and $$I_2 = I_{2m} \sin \omega_2 t \qquad (29)$$

then $$F = 8\pi\mu \frac{y}{g} N_p N_1 N_2 I_{1m} I_{2m} \sin \omega_1 t \sin \omega_2 t \qquad (30)$$

$$= K_0 I_{1m} I_{2m} \sin \omega_1 t \sin \omega_2 t \qquad (31)$$

where $$K_0 = \frac{8\pi\mu Y N_P N_1 N_2}{g} \qquad (32)$$

but $$\sin \omega_1 t (\sin \omega_2 t) = \frac{1}{2}\cos(\omega_1 - \omega_2)t - \frac{1}{2}\cos(\omega_1 + \omega_2)t \qquad (33)$$

from Equations 31 and 33

$$F = \frac{K}{2} I_{1m} I_{2m} [\cos(\omega_1 - \omega_2)t - \cos(\omega_1 + \omega_2)t] \qquad (34)$$

Equation 27 gives the force for a constant current in the primary winding and a variable current in the secondary winding.

Equation 34 gives the force in the terms of sum and difference frequencies, when the primary and secondary windings are both excited with sinusoidal currents.

*Circuitry for Combined Pick-Off and Forcer Operation*

The phase of the invention involves the excitation of a variable reluctance transducer for simultaneously monitoring the position of the tubular proof mass 21, and forcing the proof mass, to provide a simple self-check of the operation of the instrument.

(A) *Pick-off operation.*—With reference to FIGURE 4 of the drawings, the primary winding is excited by a voltage designated (51) $E_1$. The signal output appears at the opposite end of the diagram as a voltage (52) $E_2$, in accordance with equation (14) hereinbefore described, and is proportional to the displacement X. The general operation is as hereinbefore described in conjunction with pick-off operation.

(B) *Forcer operation.*—The constant current I, of equation 27, is supplied by the battery (49) designated $E_3$, as shown in FIG. 4. The capacitor (53) $C_1$ decouples the voltages (51) $E_1$ and (49) $E_3$. It is desirable to introduce the forcing signal (58) $E_4$ in a symmetrical manner, relative to the output voltage (52) $E_2$, in order that its direct effect at the output end (52) $E_2$ be zero. For this reason the secondary windings 55, 56 are split to introduce a center tap 57, as shown in FIG. 4.

The polarity of the flux produced by the primary winding (35) $I_1$, and the secondary windings (55), (56) $I_2$ and $E_4$ currents is indicated as + or — for each pole in FIGURE 4.

Note that in the even poles 2, 4, 6, 8 of the upper armature section 17, the secondary flux reinforces the primary flux. However, in the odd poles 1, 3, 5, 7 of the lower armature section 16, the secondary flux indicated by dash lines, opposes the primary flux.

The resultant axial force developed, will be directed from the armature section 16, having the even-numbered poles, to the armature section 17, having odd numbered poles 19, 19a, as shown in FIGS. 1 and 2.

A reversal of the forcing signal (58) $E_4$ (or $I_2$) will reverse the flux pattern and the axial force acting on the armature sections 16, 17 and therefore the central tube 21, shown in FIGS. 1 and 1. This resultant force produces armature motion, and therefore longitudinal motion of the central tube 21, along the sensitive axis (26).

The armature motion modulates the amplitude of the signal in the normal manner hereinbefore described for pick-off operation.

The forcer coil replaces acceleration forces in moving the proof mass off its neutral position.

The plate springs restore the proof mass to its neutral position after it is displaced.

The self-check forcer coil functions in the same manner as an acceleration force to displace the proof mass.

The self-check mechanism provides means for measuring the force required to displace the proof mass over a predetermined distance.

FIGURE 5 shows a modification of the accelerometer construction shown in FIGURES 1 and 2.

The unit is mounted in the interior of a tubular housing 63, a tubular inner housing 64 co-axial with the outer housing being fitted to the interior of the outer housing.

The inner housing may however be eliminated entirely, the apparatus being directly supported by the tubular outer housing.

The stator 61 is a substantially tubular member fitted to the interior of the housing, and fixedly attached thereto, the stator having a plurality of radially positioned poles 65, integral therewith, in the same manner as those shown in FIGURES 1 and 2. A tubular armature formed in two sections 66, 67 is mounted concentrically with the poles of the stator 61, the armature sections being fixedly attached to and supported by a central tube 68, or proof mass, in the same manner as that shown in FIGURES 1 and 2, the proof mass including the central tube 68, and the armature and other material attached thereto and moving therewith.

Each section 66, 67 of the armature has a total of four radially positioned poles 69, 70 integral therewith, in the same manner as those shown in FIGURE 1, the poles being radially aligned with the poles 65 of the stator in the same manner.

The central tube 68 is supported by a pair of flexure plate springs 22, 23, each of which includes a tubular outer ring 24, 24a which is pressed into or otherwise inserted into the interior of the housing and fixedly attached thereto, and a tubular inner ring section 27, 27a which is pressed on or otherwise fixedly attached to one end of the central tube 68.

A thin flexible central section, or diaphragm which is located between and integral with the inner and outer rings of each of the springs and located therebetween forms the flexure portions of the springs. The diaphragm of each of the springs has a plurality of cutouts 30, 30a, therethrough, to form a plurality of spring arms 31, 31a which support the inner rings 27 from the outer rings 24 in the manner shown in FIGURE 1.

The poles of one section 66 of the amature are aligned with the corresponding poles 65, of the stator in the same manner as those shown in FIGURE 1. Similarly the poles 70 of the second section 67 of the armature, which are radially angularly displaced from those of the first section, are also aligned with the corresponding poles of the stator.

The stator coils, wound around pairs of poles of the stator, are substantially the same as those shown in FIGURES 1 and 2.

The windings consist of a series of primary windings in the same manner as those shown in FIGURE 1, and another series of secondary windings, which are also substantially the same as those shown in FIGURE 1.

The primary and secondary windings function in substantially the same manner as those shown in FIGURES 1 and 2 and hereinbefore described.

In all other respects, the modified accelerometer shown in FIGURE 5 is substantially the same as those shown in FIGURES 1 and 2.

The self-check feature hereinbefore described is applicable to any variable reluctance pick-off, that is any pick-off mechanism in which the voltage couple from the primary coil is a function of the permeance between the armature and the stator.

In actual practice, the permeance or reluctance is determined by the relative projected areas between the poles of the armature and the poles of the stator for constant air gap.

The areas may be varied by longitudinal displacement of the poles of the armature, as hereinbefore described, rotary angular displacement, or any combination thereof.

It will be apparent to those skilled in the art, that the present invention is not limited to the specific details described above and shown in the drawings, and that various modifications are possible in carrying out the features of the invention and operation, actuation and the method of utilization thereof, without departing from the spirit and scope of the appended claims.

What is claimed is:

1. In combination with a linear accelerometer supported within a tubular housing;

a pick-off stator fixedly attached to the tubular housing, co-axially therewith, said pick-off stator having a plurality of radially positioned poles incorporated therewith;

a proof mass fitted to the tubular housing, co-axially with the poles of the stator;

a tubular armature fixedly attached to the proof mass, co-axially therewith, said tubular armature being formed in two sections, each section of the armature having a plurality of radially positioned poles integral therewith, the number of poles in each tubular section of the armature being equal to one-half the number of poles in the stator, the poles of one tubular section of the armature being rotationally angularly offset relative to the poles of the second tubular section thereof, the poles in said armature being radially aligned with the poles of the stator in the neutral position;

multiple flexure spring means fixedly attached to the tubular housing supporting the proof mass, to permit longitudinal displacement of the proof mass;

a plurality of primary windings fitted to the poles of the stator, each primary winding being wound around a pair of poles of the stator;

a plurality of secondary windings fitted to pairs of poles of the stator angularly displaced from the poles having primary windings fitted thereto;

an intermediate tap co-ordinated with and connected to portions of the secondary wnidings;

means adapted to supply a voltage to the primary windings to energize a variable reluctance pick-off circuit, the direction of the current through each primary winding being opposite that through the adjoining primary winding, the second windings being wound around pairs of poles of the stator, alternating with those around which the primary windings are wound, the winding direction of each secondary winding being alternated relative to that of the adjoining secondary winding, said pick-off circuit being adapted to indicate the extent of the longitudinal displacement of the poles of the armature relative to the corresponding poles of the stator, the differential flux from the secondary windings when the proof mass is displaced from its neutral position producing a voltage signal;

means connected to the secondary windings adapted to transmit as an output signal voltage the pick-off circuit signal representing the longitudinal displacement of the poles of the armature relative to the corresponding poles of the stator;

means connected to the intermediate tap connected to the second windings, adapted to generate a forcer voltage, said generated forcer voltage providing a force required to displace the proof mass and the armature attached thereto from their neutral position relative to the poles of the stator over a specific distance, as a self-check feature of the apparatus, including a pair of leads to which are fed the output signal voltage, said output signal voltage being directly proportional to the axial displacement of the poles of the armature relative to the corresponding poles of the stator, as an indication of the axial displacement of the proof mass, relative to the central position thereof; and, an auxiliary line from the intermediate tap of the secondary windings connecting the forcer voltage generating means to said leads, said forcer voltage signal being introduced into the output signal voltage symmetrically in order to provide a zero direct effect on the output signal voltage.

2. In a device as claimed in claim 1, a resistor in series with each of said leads and said auxiliary line.

3. In a device as claimed in claim 1, a filter introduced between said leads and the intermediate tap, and a load resistor introduced across said leads.

4. In combination with a transducer supported within a tubular housing;
   a pick-off stator fixedly attached to the tubular housing, co-axially therewith, said stator having a plurality of radially positioned poles incorporated therewith;
   a proof mass fitted to the tubular housing co-axially with the poles of the stator;
   a tubular armature fixedly attached to the proof mass, co-axially therewith, said tubular armature being formed in two sections, each section of the armature having a plurality of radially positioned poles integral therewith, the number of poles in each tubular section of the armature being equal to one-half the number of poles in the stator, the poles of one tubular section of the armature being rotationally angularly offset relative to the poles of the second tubular section thereof, the poles in said armature being radially aligned with the poles of the stator in the neutral position;
   flexure spring means supported by the tubular housing and attached to the proof mass, said flexure spring means being adapted to permit displacement of the proof mass, relative to the poles of the stator;
   a plurality of primary windings fitted to the poles of the stator, each primary winding being wound around a pair of poles of the stator;
   a plurality of primary windings fitted to the poles of the stator angularly displaced from the poles having primary windings fitted thereto;
   an intermediate tap co-ordinated with and connected to individual portions of the secondary windings;
   means adapted to supply a voltage to the primary windings to energize a variable reluctance pick-off circuit between the poles of the stator and the corresponding poles of the armature, to indicate the extent of the displacement of the poles of the armature relative to the corresponding poles of the stator, the direction of the current through each primary winding being opposite that through the adjoining primary winding, the secondary windings being wound around pairs of poles of the stator, alternating with those around which the primary windings are wound, the winding direction of each secondary winding being alternated relative to that of the adjoining secondary winding;
   means connected to the secondary windings adapted to transmit as an electrical output signal voltage, the displacement of the poles of the armature relative to the corresponding poles of the stator, the differential flux from the secondary windings when the proof mass is displaced from its neutral position producing a voltage signal;
   means connected to the intermediate tap incorporated with the secondary windings, adapted to generate a forcer voltage, said generated forcer voltage providing a force required to displace the proof mass and the armature attached thereto from their neutral position, relative to the poles of the stator over a controlled distance, as a self-check feature of the apparatus, including a pair of leads to which are fed the output signal voltage, said output signal voltage being directly proportional to the displacement of the poles of the armature relative to the corresponding poles of the stator, as an indication of the displacement of the proof mass, relative to the neutral position thereof; and
   an auxiliary line from the intermediate tap of the secondary windings connecting the forcer voltage generating means to said leads, said forcer voltage signal being introduced into the output signal voltage symmetrically in order to provide a zero direct effect on the output signal voltage.

5. In a device as claimed in claim 4, a resistor in series with each of said leads and said auxiliary line.

6. In a device as claimed in claim 4, a filter introduced between said leads and the intermediate tap, and a load resistor introduced across said leads.

References Cited by the Examiner

UNITED STATES PATENTS

| | | | |
|---|---|---|---|
| 2,669,126 | 2/54 | Simmons | 336—134 |
| 2,870,422 | 1/59 | Gindes | 336—30 |
| 2,923,904 | 2/60 | Hieber | 336—30 |
| 2,946,226 | 7/60 | Wendt | 73—517 |
| 2,947,176 | 8/60 | Perry | 73—517 |
| 3,030,595 | 4/62 | Campbell | 73—417 X |

RICHARD C. QUEISSER, *Primary Examiner.*

S. LEVINE, J. E. WEST, ROBERT L. EVANS,
*Examiners.*